M. Chandler.

Horse Hoe.

№ 2808 Reissued Dec. 3, 1867.

Witnesses.
J. Coombs
Geo Reed

Inventor
Moses Chandler
Per Munn & Co
Attorneys

United States Patent Office.

R. B. DUNN AND JOHN C. FLINT, OF BANGOR, ASSIGNEES BY MESNE ASSIGNMENTS OF MOSES CHANDLER, OF EAST CORINTH, MAINE.

*Letters Patent No.* 34,128, *dated January* 14, 1862; *reissue No.* 2,808, *dated December* 3, 1867.

IMPROVEMENT IN HORSE-HOES.

The Schedule referred to in these Letters Patent and making part of the same.

TO ALL WHOM IT MAY CONCERN:

Be it known that MOSES CHANDLER, of East Corinth, in the county of Penobscot, and State of Maine, has invented a new and improved Horse-Hoe; and we, JOHN C. FLINT, of Bangor, in the State of Maine, and R. B. DUNN, of Bangor, in the same State, assignees of said patent by mesne assignments, do hereby declare that the following is a full, clear, and exact description of the same, reference being had to the accompanying drawings, making a part of this specification, in which—

Figure 1:
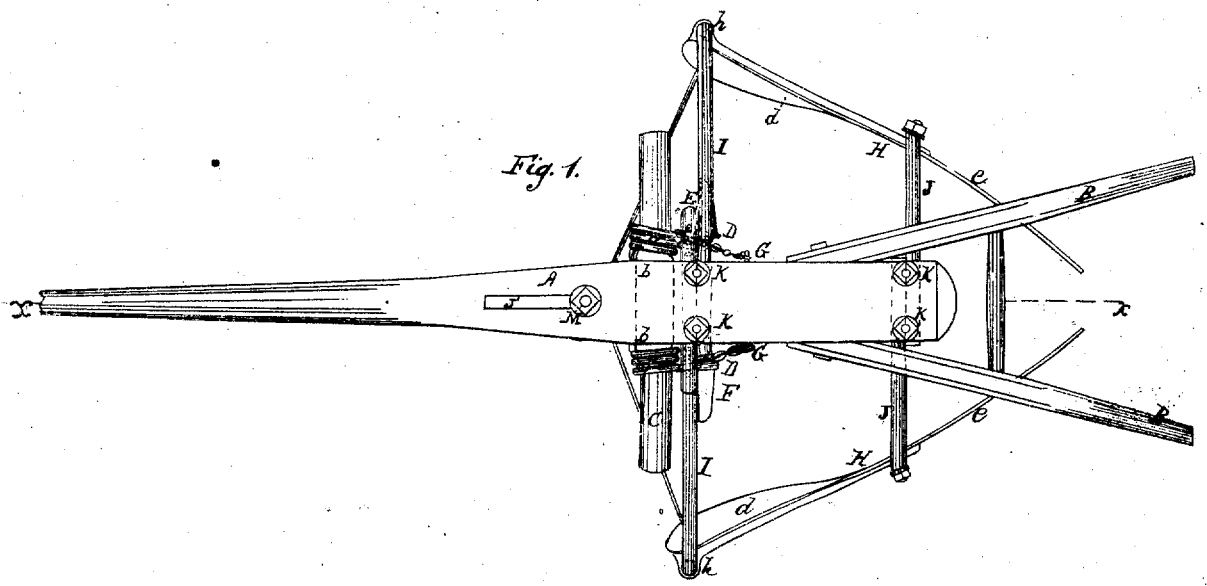

Figure 1 is a plan or top view of the invention.

Figure 2:
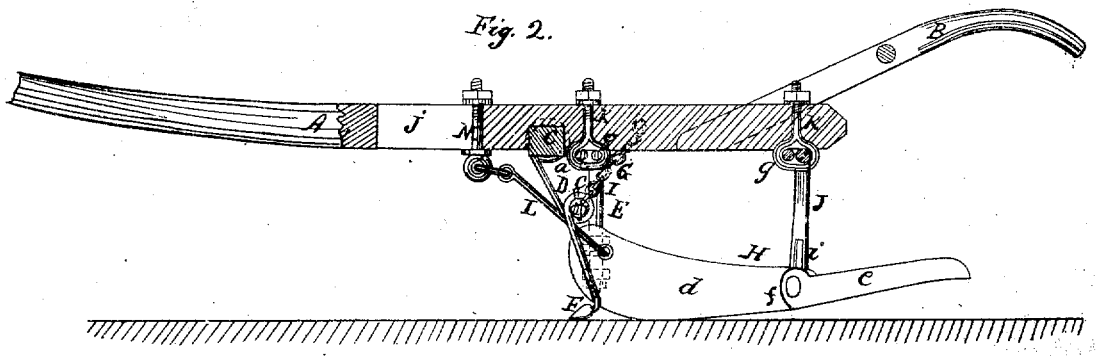

Figure 2, a side sectional view of the same, taken in the line X X, fig. 1.

Similar letters of reference indicate corresponding parts in the two figures.

The object of this invention is to provide an implement of simple construction, which may be readily adjusted so as to furrow land for planting either in hills or drills, and to form the furrows at a greater or less distance apart, and at a greater or less depth, as may be desired; the implement also being so constructed as to be adapted for covering seed in the drills of a uniform depth, and of any desired depth; and also to hoe and hill up growing crops.

The invention consists in the employment of two shares converging towards their rear, and made capable of adjustment to or from each other, either at their front or rear ends, or both.

Also in so attaching or jointing the forward ends of these shares to their supporting rods as that they may be turned and adjusted thereon, as on centres, more or less obliquely, relatively to the beam.

Also in a means for adjusting vertically the rear, and also the front ends of these shares, to vary the depth of their penetration into the earth.

Also in appending to these shares pivoted wings, extending rearwards therefrom.

Also in so connecting these wings to the shares as that they will partake of their vertical adjustments, and also admit of being thrown up out of action when not needed.

Also in forming the under side of these wings with a slight concave curvature, to round up the dirt as the furrow is covered.

Also in adjustably securing and steadying the share-supporting rods to the beam by means of screw-threaded eyes and nuts.

Also in the employment of adjustable and yielding cultivator-blades, which are also adapted to be lifted and held out of action when desired.

Also in a means for adjusting the cultivator-blades and their supports to or from each other, without unfastening them from the bar to which they are secured.

Also in a provision for adjusting the stay-rods which brace the shares, so as to meet the changes of positions of the shares; and in other details hereinafter mentioned.

To enable those skilled in the art fully to understand and construct a horse-hoe and cultivator made in accordance with the invention, I will proceed to describe it.

A represents the beam of the implement, the back part of which has two handles, B B, attached to it of the usual form. C is a cross-bar, which is attached to the beam A at a point a short distance in front of the lower ends of the handles B B. This cross-bar projects at equal distances from the beam A at each side, and on said bar C, at each side of the beam, there is fitted a spiral or coil, *a*, of a stout metal bar or rod, D, the inner ends of the spirals or coils being attached to the beam A, as shown at *b*. The spirals or coils *a* form springs for the rods D, and each rod, at about midway between its free end and bar C, is wound into a single coil or loop to receive the ends of bar E, the rods being retained in proper place on bar E by pins *c*. To the lower end of each rod D there is attached a cultivator-blade, F. The force exerted by the coil *a* tends always to bear the blade forward against the pull of the chain. Each rod, D, has a chain, G, attached to it, said chains being connected to the beam A. By taking up or lengthening these chains on the beam A, in any well-known manner, the rods D may be more or less inclined, and the depth of the penetration of the blades F in the earth regulated as desired. Whiffle-trees are attached to the ends of the cross-bar C. H H represent two shares, and their pivoted wings or blades, *d* designating the share, and *e* the wing or blade, slightly curved on its under side, the two being connected together by a pivot or bolt, *f*. The shares *d* are attached to curved or bent rods I J, which are secured to the under side of the beam A by eyes or loops *g* at the lower ends of the screw-bolt K, which pass through the beam, as shown clearly in fig. 2. The front ends of the parts *d* of the wings H are attached by joints *h* to the rods I, so that said parts *d* may be turned thereon, and adjusted, more or less obliquely, relatively to the beam A, and also raised or lowered by means of the screw-thread and nut on the rods, and the back ends of the parts *d* are attached to the rods J, by the pivots or bolts *f*, which pass through oblong vertical slots *i* in the lower parts of the rods J, and are adjustable therein. By means of these provisions for adjustment, the shares may be lowered or raised at will and held in the desired position, either at their front or rear ends, or both. To the front end of each part, *d*, of the wings, there is attached a stay-rod, L. The front ends of the rods L are attached to the lower end of a bolt, M, which is fitted in a longitudinal slot, *j*, in the beam A.

The implement is used as follows: When drills are to be made, the shares are adjusted so as to be nearly parallel with each other, and at a distance apart corresponding with the required distance between the drills. This may be effected by adjusting the rods I J longitudinally to the proper positions in the eyes *g* of the bolts K, and securing them firmly in such positions.

In forming or making furrows, the cultivator-blades F may be drawn up free from the ground, and retained in such position by the chains G. The greater the angle to which the shares are adjusted relatively to each other, the deeper will be the furrows.

In covering seed in drills, the shares *d* are placed in a more or less oblique position relatively to the beam, and the wings *e* are more or less elevated, according to the height of the ridge of earth required over the seed. The higher the wings *e* are raised, the higher the ridge of earth will be, and *vice versa*, and the greater their curvature on the under side, the more will the top of the ridge be rounded off. The depth of the penetration of the shares *d* in the earth may be graduated by raising their rear ends, the slots *i* in the lower parts of the rods J admitting of such adjustment. It will be seen that the shares and their blades or wings will throw earth upon both sides of the growing plants, and as near to the same as may be desirable, and when used for such purpose the cultivator-blades F F are lowered by lengthening the chains G, so that they may act upon the earth and serve to loosen or lighten up the same, and deprive it of weeds. The springs of the rods D are sufficiently strong to allow the blades F to pass through the earth and perform their proper functions, but they will yield or give in case the blades meet with any obstruction in the earth, and will therefore prevent the rods D being broken or injured, or any parts connected therewith being strained. They also allow the lateral adjustment of the blades F. The blades F F may be adjusted at a greater or less distance apart by sliding the rods D D on the bar E, and securing them nearer together or further apart by means of the pin *c*. The stay-rods L are adjusted to suit the different adjustments of the shares *d* by means of the adjustable bolt M in the slot *j* of the beam, a nut thereon serving to secure the bolt firmly in the desired position.

It is evident that my improved implement is adapted for great varieties of crops, not being confined in its uses to any particular vegetable production. It will be perceived from the above description that this single machine, both simple and cheap, has a very wide range of usefulness, comprising literally within itself the functions of a drill, a drill-coverer, (hilling up from both sides of the drill,) a cultivator, and a weeder, the parts being easily adjusted, or thrown out of action, for the performance of these different duties, and also for performing them in different ways, and under different conditions.

We claim as the invention of MOSES CHANDLER, and desire to secure by Letters Patent—

1. The employment of two shares coverging towards their rear, and made capable of adjustment to or from each other, either at their front or rear, or both.

2. So attaching or jointing the forward ends of these shares to their supporting rods as that they may be turned and adjusted thereon as centres, more or less obliquely relatively to the beam.

3. The means, substantially as described, for adjusting vertically the rear ends of the shares to vary the dept of their penetration into the earth.

4. The combination with the shares of pivoted wings, extending rearwards therefrom.

5. So connecting the wings to the shares as that they will partake of their vertical adjustments, and also admit of being thrown up out of action when not needed.

6. A wing constructed with a slightly-concave curvature on its under side, to round up the earth as the furrow is covered.

7. Supporting the shares upon bent rods capable of being adjusted laterally in the devices which hold them in position.

8. Supporting the shares, both at front and rear, upon such rods to admit of either end being adjusted relatively to the other.

9. So supporting the shares by means of rods and adjusting-devices that they may be lowered or raised, either at their front ends or at their rear ends, at option or at both, substantially as shown and described.

10. Securing adjustably and steadying the share-supporting rods to the beam by means of screw-threaded eyes or loops and nuts.

11. The adjustable and yielding cultivator-blades, adapted to be lifted and thrown out of action when desired.

12. The means, substantially as described, for adjusting the cultivator-blades and their supports to or from each other, without unfastening them from the bars to which they are secured.

13. Forming in one piece the cultivator-blade support, and the coiled spring which sustains it, and admits of its various movements, substantially as described.

14. The provision in the beam of a slot, J, as and for the purpose described.

15. The adjustable stay-rod, as and for the purpose described.

16. The combination, with the stay-rods which brace the shares, of the slot in the beam, and means for firmly securing the rods in variable positions, substantially as described.

R. B. DUNN,
JOHN C. FLINT.

Witnesses:
A. C. FLINT,
E. C. BRETT.